United States Patent Office 2,790,719
Patented Apr. 30, 1957

2,790,719
FOOD FLAVOR INTENSIFIER
Earl B. Glickman, Chicago, Ill.
No Drawing. Application April 21, 1953,
Serial No. 350,260
6 Claims. (Cl. 99—140)

This invention relates to a composition for intensifying food flavors and it is an object of this invention to produce a food flavor intensifier of the type described which is permanent in operation, non-toxic, non-coloring, substantially free of taste, and which may be used in sufficiently small amounts to intensify the natural flavor of food without undesirable after-taste or without undesirable sensations.

It has been found in accordance with the practice of this invention that an excellent taste and flavor intensifier free of the objectionable features outlined above may be prepared with L glutamic acid or its sodium or ammonium salts in combination with a lesser amount of an extract of gentian.

Both glutamic acid and ammonium glutamate have been used to intensify flavor and taste of food products but, as defined in United States Patent No. 2,512,385, when used in amounts sufficient to give the desired results they each give an objectionable sharp and sour taste. Sabine, in Patent No. 2,512,385, has found that this objectionable sharp and sour taste may be reduced by a specific combination of glutamic acid and ammonium glutamate, alone but preferably in combination with glycine.

Use also has been made of gentian as a flavor and taste intensifier but the only successful use of which applicant is aware has been in combination with ascorbic acid in an alcohol or glycol medium, as described in United States Patent No. 2,539,160. When gentian is used, alone or in combination with ascorbic acid, as described in the above mentioned patent, in sufficient quantities satisfactorily to intensify the flavor of the food, a stinging sensation is imparted to the tongue which lingers long after the food has been consumed. When the amount of gentian is reduced to avoid this unpleasant sensation and after-taste, the amount is insufficient to provide the desired intensification of the natural flavor of the food being consumed.

The object of this invention is to produce a flavor intensifer of the type described which can be used in amounts effective to give the desired intensification of natural flavors of the food without any side taste or stinging sensation and without after-taste. When the combination of gentian and L glutamic acid is used, it has been found that the gentian functions to stimulate the taste faculties of the tongue in such a manner that the L glutamic acid becomes more effective and therefore can be used in considerably lesser quantities to achieve flavor intensification than have heretofore been required and is therefore able to intensify and develop the natural flavors without creating the unpleasant tastes or after-tastes which have heretofore resulted from the use of glutamic acid or its salts in amounts to provide an equivalent level of flavor intensification.

It has also been found in accordance with the pratcice of this invention that the combination of gentian and L glutamic acid permits the use of markedy reduced amounts of gentian with the elimination of the stinging sensations whch have heretofore been experienced when gentian was used alone in substantially greater quantities necessary for flavor intensification. When used in combination with glutamic acid, the gentian, though present in amounts considerably less than heretofore required, is able to supply sufficient stimulation to enable the glutamic acid to supply flavor intensification with lesser amounts than have heretofere been required.

Because of the increased potency from reduced quantities of the gentian and glutamic acid in combination, it is desirable to disperse the materials in admixture with a large amount of carrier. It is preferred to make use of salt, sucrose or other seasoning as the carrier but use may be made in solutions in gums or other soluble liquids for admixture with other ingredients in the preparation of foods. When dispersed in salt or sucrose, the seasoning may be added in usual amounts since the intensifier combination does not function materially to change the effect of the salt or the sugar. It will be understood that the amount of intensifier incorporated or applied to the food products depends greatly upon the individual tastes of the consumer and upon the type of food that is being prepared. Thus it is expedient to define the amounts of intensifier used in accordance with the individual tastes of the user and in variation therewith.

While the amount of intensifier depends upon individual taste, the ratio of gentian to glutamic acid should be maintained within the range of 1 part by weight gentian to 1–50 parts by weight glutamic acid and it is preferred to maintain the ingredients within a ratio of 1 part by weight solid extract of gentian to 3–20 parts by weight glutamic acid. Instead of glutamic acid, use may be made of the salts thereof such as ammonium glutamate, sodium glutamate, and the like.

The following formulations embodying features of this invention are given by way of illustration, but not by way of limitation:

*Example 1*

| | Parts |
|---|---|
| L glutamic acid | 50 |
| Solid extract of gentian | 2½ |
| Salt | 300 |

The glutamic acid and gentian may be combined and then dispersed with the salt in a suitable blending or mixing apparatus.

*Example 2*

| | Parts |
|---|---|
| L glutamic acid | 10 |
| Solid extract of gentian | 3 |
| Dextrose | 350 |

The glutamic acid is blended with the crystals of dextrose or other suitable carrier. Then the gentian is incorporated but because of the high viscosity of the gentian, it is desirable first to dilute the gentian with water (about equal parts) before combining with the other ingredients.

The seasoning powder may be sprinkled onto the food in which the flavor is to be developed or incorporated with the food during preparation. As previously pointed out, the amount incorporated will depend upon the individual tastes. The intensifying composition is sufficiently stable to retain its properties without introducing foreign tastes or other undesirable sensations.

It is preferred to make use of materials of uniform particle size in order to prevent segregation or non-uniform delivery and to prevent undesirable agglomeration after compounding, corn starch, magnesium carbonate, or other substance to prevent wetting of the particles under high humidity conditions may be incorporated. When the particle size is not uniform, grinding or milling may be necessary after mixing.

It will be understood that instead of an extract of gentian, use may be made of gentian in powder or as a tincture of gentian. It will be further understood that changes may be made in the details of formulation, method of incorporation and application without departing from the spirit of the invention, especially as defined in the following claims.

I claim:

1. A composition for intensifying the flavor of foods in which the flavor intensifying ingredient consists essentially of the combination of gentian and L glutamic acid present in the ratio of 1 part by weight gentian to 1–50 parts by weight L glutamic acid.

2. A composition for intensifying the flavor of foods in which the flavor intensifying ingredient consists essentially of the combination of gentian and a compound selected from the group consisting of L glutamic acid, ammonium glutamate and sodium glutamate present in the ratio of 1 part by weight gentian to 1–50 parts by weight of the glutamic compound.

3. A composition for intensifying the flavor of foods in which the flavor intensifying ingredient consists essentially of the combination of gentian and a compound selected from the group consisting of glutamic acid, ammonium glutamate and sodium glutamate present in the ratio of 1 part by weight gentian to 3–20 parts by weight of the glutamic compound.

4. A composition for intensifying the flavor of foods comprising the combination of a gentian root extract and a compound selected from the group consisting of glutamic acid, ammonium glutamate and sodium glutamate present in the ratio of 1 part by weight gentian to 1–50 parts by weight of the glutamic compound, and a carrier.

5. A composition as claimed in claim 4 in which the carrier is salt.

6. A composition as claimed in claim 4 in which the carrier is sucrose.

References Cited in the file of this patent

UNITED STATES PATENTS

| | | |
|---|---|---|
| 1,829,431 | Allen | Oct. 27, 1931 |
| 2,284,822 | Heller | June 2, 1942 |
| 2,512,385 | Sabine | June 20, 1950 |
| 2,539,160 | Phillips | Jan. 23, 1951 |